(12) United States Patent
Kim et al.

(10) Patent No.: US 12,153,539 B1
(45) Date of Patent: Nov. 26, 2024

(54) GPU-OPTIMIZED APPEND OPERATION WITH LATCH-FREE WRITE COMBINING ON SHARED MEMORY

(71) Applicant: Oracle International Corporation, Redwood Shores, CA (US)

(72) Inventors: Kangnyeon Kim, Dublin, CA (US); Weiwei Gong, Belmont, CA (US); James Kearney, Bolton, MA (US); Harshada Chavan, Redwood Shores, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/201,073

(22) Filed: May 23, 2023

(51) Int. Cl.
  *G06F 15/16* (2006.01)
  *G06F 15/167* (2006.01)
(52) U.S. Cl.
  CPC .................................. *G06F 15/167* (2013.01)
(58) Field of Classification Search
  CPC ........................................................ G06F 15/167
  USPC ........................................................ 711/101
  See application file for complete search history.

(56) References Cited

U.S. PATENT DOCUMENTS

2016/0188491 A1* 6/2016 Apodaca ............. G06F 12/0804
    711/133

OTHER PUBLICATIONS

Wang, Kai et al. "Fast Fine-Grained Global Synchronization on GPUs", 2019 Architectural Support for Programming Languages and Operating Systems (ASPLOS '19), Apr. 13-17, 2019, Providence, RI, USA. ACM, New York, NY, USA, 14 pages.
Lutz, Clemens et al., "Triton Join: Efficiently Scaling to a Large Join State on GPUs with Fast Interconnects", SIGMOD '22, Jun. 12-17, 2022, Philadelphia, PA, USA, 16 pages.
Intel Corporation, "Write Combining Memory Implementation Guidelines", Nov. 1998, 17 pages.
Gao, Lan et al., "Adaptive Contention Management for Fine-Grained Synchronization on Commodity GPUs", ACM Trans. Archit. Code Optim. 19, 4, Article 58, Aug. 2022, 21 pages.
"hyPACK-2013 Mode-2 : GPU Comp. CUDA enabled NVIDIA GPU Prog. CUDA Asynchronous Concurrent Execution & Streams", Centre for Development of Advanced Computing, 8 pages.

* cited by examiner

*Primary Examiner* — Jae U Yu
(74) *Attorney, Agent, or Firm* — Hickman Becker Bingham Ledesma LLP; Stephen R. Tkacs (57) ABSTRACT

An append operation is provided for using a plurality of threads on a plurality of streaming multiprocessors of a graphical processing unit. The append operation writes results into a result buffer. Executing the append operation comprises claiming, by each given thread within the plurality of threads having a result to write, a portion of a selected WCB, writing, by the given thread, the result to the portion of the selected WCB, and in response to a flush condition being met for the selected WCB, copying contents of the selected WCB to a result buffer.

20 Claims, 4 Drawing Sheets

GPU-OPTIMIZED APPEND OPERATION WITH LATCH-FREE WRITE COMBINING ON SHARED MEMORY

FIELD OF THE INVENTION

The present invention relates to an append operation optimized for graphics processing units to provide both space efficiency and high performance.

BACKGROUND

GPUs are increasingly being used for general-purpose applications because GPUs allow a significant increase in computing performance by using many arithmetic logic units (ALUs) designed for parallel operations. GPUs execute many threads on a set of data at the same time. One example of an application of GPUs for parallel execution of workload is materialization of hash probe results in a database server. As GPU-attached dynamic random-access memory (DRAM) is limited in capacity, append operations are often used to store results without wasting space when it is not possible to decide where to store results statically. Because join cardinality is often unknown or one-to-many, the number of join results that will be found during a single probe is usually not predictable, and thus a location to store each result in a contiguous space compactly cannot be determined ahead of time. Therefore, the results should be appended to a single contiguous space on-the-fly whenever a matching key is found.

Despite its usefulness, an append operation comes with a huge performance overhead when implemented poorly on a GPU. An append operation requires an offset counter that indicates the next empty space in a result buffer. A writer thread must first claim a memory space in a result buffer by automatically incrementing the offset counter by the size of its write using an atomic instruction, such as atomicAdd, and fill out the claimed space in turn. Synchronization takes place when bumping up the offset counter, and performance can collapse when there is excessive contention between threads on the offset counter. In massively parallel hardware like GPUs, frequent synchronization, especially in global memory, is considered very harmful as the number of threads can be extremely high.

The main technical challenge is how to mitigate contention between an extremely large number of threads on a GPU while storing data in a contiguous space in global memory. Many existing solutions do not address the problem associated with the assumption that results can be written contiguously with a precalculated address for every output, which is not possible for certain kernels like a hash probe. Some solutions sidestep the issue without addressing how to implement an append operation.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

The illustrative embodiments provide a latch-free append algorithm that leverages write-combining buffers in GPU shared memories for mitigating contention. Coalescing global memory accesses in shared memory is trivial to do when the cardinality is 1:1 (one output for one input), because the address for each result can be precalculated in a contiguous space. However, the illustrative embodiments apply the principal to an append operation with GPU optimizations that include using shared memory and GPU-specific synchronizations.

The append algorithm of the illustrative embodiments is composed of three suboperations: a block append, a global append, and a leftover flush. The block append suboperation accumulates appends from the same thread block into a write-combine buffer (WCB) in a shared memory within the GPU. Each shared memory corresponds to a particular thread block from a plurality of thread blocks executing in the GPU and is accessible by all threads of the corresponding thread block. The global append suboperation appends a WCB to a result buffer residing in global memory of the GPU in response to a flush condition. The global memory is a memory that is accessible by all thread blocks or a plurality of thread blocks in the GPU. The conditions for flush of a WCB are different for fixed-size data and variable-size data. The leftover flush suboperation appends the leftovers in the WCBs to the result buffer after processing all kernel inputs.

The capacity of the DRAM in a GPU card is limited. Also, GPU cards are equipped with high-bandwidth memory (HBM), which is more costly than typical double data rate (DDR) DRAM. The illustrative embodiments improve space and cost efficiency because the append algorithm eliminates waste of GPU memory usage. Furthermore, a GPU's parallelism can be turned into performance gain only if the GPU code is well-parallelized. The illustrative embodiments provide high concurrency with a scalable append operation. This can lead to overall query performance improvement.

GPU Architecture

Figure 1:
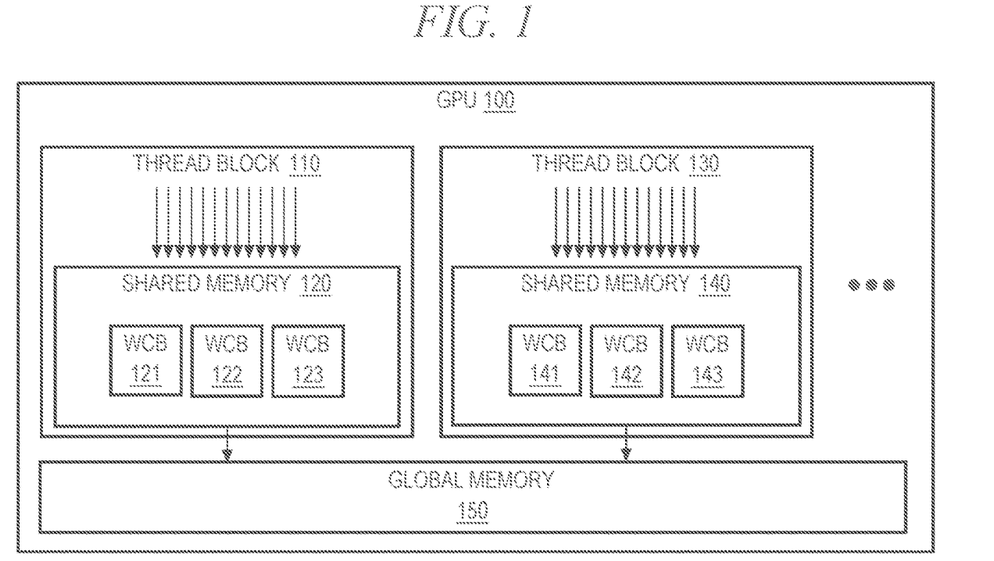
FIG. 1 is an example block diagram of a graphics processing unit in which a latch-free append algorithm of the illustrative embodiments may be implemented.

The illustrative embodiments may be utilized in many different types of data processing environments. To provide a context for the description of the specific elements and functionality of the illustrative embodiments, FIG. 1 is provided hereafter as an example environment in which aspects of the illustrative embodiments may be implemented. It should be appreciated that FIG. 1 is only an example and is not intended to assert or imply any limitation regarding the environments in which aspects or embodiments of the present invention may be implemented. Many modifications to the depicted environments may be made without departing from the spirit and scope of the present invention.

FIG. 1 is an example block diagram of a graphics processing unit (GPU) in which a latch-free append algorithm of the illustrative embodiments may be implemented. In accordance with an illustrative embodiment, an application, such as a database server application, performs operations using the GPU 100 to leverage the highly parallelized nature of the GPU architecture. GPUs execute a large number of threads on a set of data at the same time. Execution of code on a GPU is divided among streaming multiprocessors, blocks, and threads. The GPU has several different memory spaces, with each having particular features and uses, as well as different speeds and sizes. The memory space of a GPU is divided hierarchically into different portions, including global memory, shared memory, local memory, constant memory, and texture memory, each of which can be accessed from different points in a program.

A thread block is a group of threads that run on the same streaming multiprocessor (SM). Threads in the same thread block can share certain block-local resources, including shared memory. Global memory is memory that is accessible from all threads in a GPU. Typically, global memory is an off-chip memory that is comprised of high-bandwidth memory (HBM) with long access latency. On the other hand, shared memory is memory that is shared between threads in the same thread block. Typically, shared memory is on-chip memory that provides a much faster access latency than global memory; however, the size of shared memory is limited. Shared memory is mainly used for reducing the overhead of global memory accesses by storing hot data.

With reference to FIG. 1, GPU 100 executes multiple thread blocks, including thread blocks 110, 130. In some example implementations, thread blocks are organized in grids (not shown). An example GPU implementation can execute up to 1024 threads in a thread block. In accordance with the illustrative embodiments, a kernel, such as a hash probe, is a function that compiles to run on GPU 100 with the aid of threads in thread blocks 110, 130. In the depicted example, thread block 110 accesses shared memory 120, and thread block 130 accesses shared memory 140. All threads, including threads in thread blocks 110, 130, access global memory 150.

Block Append

The latch-free append algorithm of the illustrative embodiments is composed of three sub-operations: a block append, a global append, and a leftover flush. The purpose of the block append sub-operation is to mitigate frequent synchronization on a global offset counter, which is very costly on a GPU. As shown in FIG. 1, shared memory 120 is partitioned into multiple write-combine buffers (WCBs) 121, 122, 123, and shared memory 140 is partitioned into multiple WCBs 141, 142, 143. The reason for using multiple WCBs is to alleviate intra-block contention by distributing atomic accesses over multiple offset counters. In some embodiments, the WCBs use a latch-free design that employs atomic instructions instead of locking for high concurrency and correctness. The actual number of WCBs and the size of each WCB are tuning parameters that can be set based on the underlying GPU and the target workload.

Figure 2:
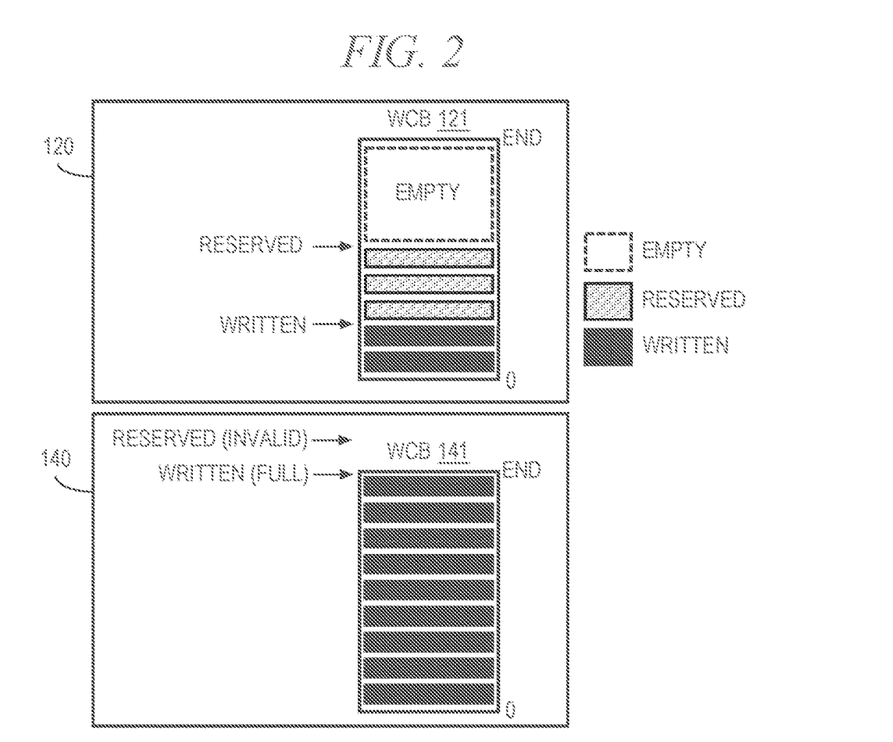
FIG. 2 is a block diagram illustrating a write-combine buffer and associated offset counters in a shared memory in accordance with an illustrative embodiment.

FIG. 2 is a block diagram illustrating a write-combine buffer and associated offset counters in a shared memory in accordance with an illustrative embodiment. FIG. 2 shows WCB 121 in shared memory 120 and WCB 141 in shared memory 140. Each WCB is associated with two offset counters: a reserved offset counter and a written offset counter. Both counters are kept in shared memory. The reserved offset counter indicates how many spaces in a WCB have been claimed by writer threads (threads in a thread block that are writing results to the WCB). The written offset counter indicates the amount of data written in a WCB. Offset counters start from 0 (zero) and increment upwards by the writer thread's atomic increment indicating the amount being written.

The block append sub-operation comprises finding a WCB, claiming a portion in the selected WCB, validating the claimed portion, writing into the claimed portion, and reporting completion of the write. Thus, a writer thread first finds a WCB that has enough empty space (the difference between the WCB size and the reserved offset counter). For example, as shown by the dotted box in WCB 121 in FIG. 2, WCB 121 has empty space; however, WCB 141 does not have empty space for a writer thread to claim. If the size of the empty space of a WCB is larger than the size of the write, then the writer thread selects the WCB, such as WCB 121, and then proceeds to claim a portion in the WCB. If there is no WCB with sufficient empty space, the writer thread continues to busy-wait until a WCB becomes available. Depending on policy, a thread can visit WCBs in random order or keep circulating through the WCBs in round-robin fashion.

A writer thread that has selected a WCB claims a portion in the WCB by incrementing the WCB's reserved offset counter atomically by the size of the wrote. An atomic instruction (e.g., atomicAdd or fetch-and-add) used for updating the counter may return the old offset counter value. Thus, in one embodiment, the step of selecting a WCB and the step of claiming a portion in the WCB can be combined, because a writer thread can examine the size of the empty space using the return value of the atomicAdd instruction. However, an alternative embodiment uses a separate step for selecting a WCB for performance reasons, because once the reserved offset counter moves beyond the valid range, the step of selecting a WCB can filter out threads using a regular memory read, which is cheaper than an atomicAdd instruction, thus reducing contention overhead in the shared memory.

The writer thread then validates the claimed portion using the reserved offset counter. A reserved offset counter value is considered valid when it is smaller than the size of the WCB. It is possible for the reserved offset counter value to be in an invalid range (i.e., greater than WCB size) because many concurrent writers can increment the reserved offset counter at the same time. Writer threads that claimed invalid portions can start over by selecting a new WCB. As shown in FIG. 2, WCB 141 has a reserved offset counter that is greater than the WCB size, which is invalid. Therefore, the WCB is ignored by writer threads that are selecting a WCB, and writer threads that claimed portions in WCB 141 beyond the WCB size start over by selecting another WCB.

A writer thread that has selected a WCB and successfully validated a claimed portion in the selected WCB can then issue a write to shared memory to fill out the claimed portion in the WCB. In the example depicted in FIG. 2, a writer thread writing to WCB 121 writes to a reserved portion. In one embodiment, the writer thread puts a compiler fence to make the writes visible to other threads.

A writer thread reports completion of the write by atomically updating the written offset counter that keeps track of how much space of a WCB has been filled. A writer thread checks the return value of previous atomic updates on the written offset counter to determine whether a WCB must be flushed. A flush of a WCB comprises writing the contents of the WCB to global memory, as will be described in further detail below. If a flush is not necessary, the block append sub-operation is completed at this point.

Database users choose a data type (e.g., numeric, string, etc.) for data, and the database system, in general, chooses a physical format to efficiently store the data types. The different data types will result in either fixed-length or variable-length data being written to the WCBs and ultimately to the result buffer in the global memory. For example, if the data type of an input column is BINARY_FLOAT or BINARY_DOUBLE and the database system performs a join operation with the input column, the query will choose an append operation with fixed-size data. On the other hand, if the data type of the input column is VARCHAR (a variable-length string) and the database system performs a join operation with the input column, then the query will choose an append operation with variable-length data. Thus, the append operation of the illustrative embodiments supports both fixed-size and variable size data.

The conditions for flush of a WCB are different for fixed-size data and variable-size data. For fixed-size data, a writer thread that reaches the end of the WCB, which means the WCB has become full (e.g., WCB 141 in FIG. 2), is elected as the flusher thread. By the semantic of atomic increment, it is guaranteed that only a single thread meets this condition. The conditions for variable-size data are described below with respect to variable-length data support, because variable-length data requires changes throughout the block append sub-operation. Once the flush condition is met in either the fixed-size case or the variable-size case, the flusher thread proceeds to the global append sub-operation.

Global Append

Figure 3:
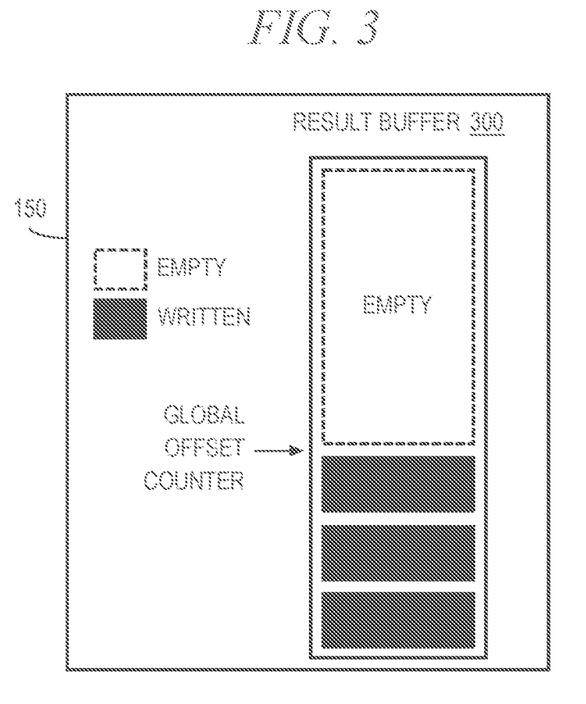
FIG. 3 is a block diagram illustrating a result buffer in global memory in accordance with an illustrative embodiment.

FIG. 3 is a block diagram illustrating a result buffer in global memory in accordance with an illustrative embodiment. The flusher thread elected during the block append sub-operation performs the global append sub-operation. The flusher thread first atomically updates the global offset counter by the size of the WCB and copies the contents of the WCB into the result buffer 300 in global memory 150.

Once the flusher thread completes the write to global memory 150, the flusher thread must reset both WCB counters to recycle the WCB. In one embodiment, resetting the offset counters are performed in the following order for correctness: 1) reset the written offset counter to 0 (zero) and fence, and 2) reset the reserved offset counter to 0 (zero) and fence. At this point the WCB becomes available. If reset is performed in the reverse order (the reserved offset counter is reset first), then the WCB can accept new writer threads before resetting the written offset counter, and new writers can see the old written offset counter value, which is not valid. The fence is needed to make the new counter values visible. After the global append sub-operation completes, the WCB becomes available for new writer threads.

Leftover Flush

Once the kernels consume all inputs, there can be partially filled WCBs where the flush condition has not been met, leaving leftover results that have not been flushed to global memory. To flush them, a master thread for each thread block is elected. The master thread calculates a total size of all leftovers across WCBs in the shared memory of the thread block and increments the global offset counter atomically to claim a portion of the result buffer 300 for the leftovers. Then, a flusher tread is elected for each thread group having leftover results to append the leftover results to the result thread 300 in parallel.

Variable-Length Data Support

Although the data structure and algorithms described above can support fixed-length data, variable-length data can introduce several corner cases. The illustrative embodiments recognize possible issues and provide modifications required to support variable-length data.

In an example, all WCBs may have only 1B of free space and all writer threads attempt to append 2B of data. In that situation, none of the threads can reserve a portion in a WCB due to insufficient free space. Furthermore, WCBs remain unflushed because they cannot accept a new writer thread for the same reason. In this case, the flush condition cannot be met, blocking all progress. Therefore, it must be possible to flush a WCB before its free space become smaller than any possible write size.

Figure 4:
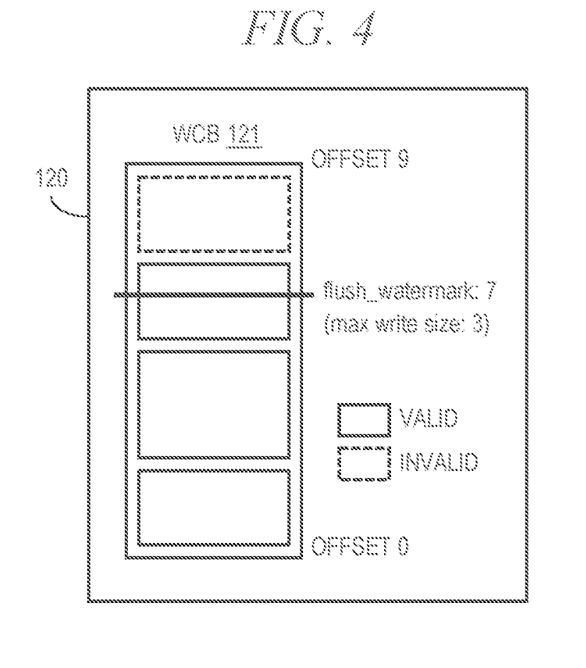
FIG. 4 is a block diagram illustrating a write-combine buffer and a flush watermark for variable-size data in a shared memory in accordance with an illustrative embodiment.

FIG. 4 is a block diagram illustrating a write-combine buffer and a flush watermark for variable-size data in a shared memory in accordance with an illustrative embodiment. The illustrative embodiment provides a new flush watermark threshold that is used in a validation and flush protocol for variable-size data. In one embodiment, the flush watermark is set as follows:

flush_watermark=WCB limit−$L$ max(the maximum possible size of a write)

The gap between the flush watermark threshold and the WCB limit is always sufficient to accommodate any size of a single write request. The illustrative embodiment assumes that the maximum possible write size is known.

The gap between the flush watermark threshold and the WCB limit is treated as a spare area to store the largest write rather than regular WCB space. Therefore, the range of a valid portion in a WCB must be redefined. Under the policy of this embodiment, the start position of a valid portion is before or on the flush watermark threshold. Any portion that entirely falls within the gap between the flush watermark and the WCB limit is considered invalid. If the start offset of a claimed portion is less than or equal to the flush watermark threshold, then the claimed portion passes validation. The start offset in the validation logic is the return value of atomnicAdd on the reserved offset counter when the portion is claimed by the writer thread.

Unlike the fixed-length data case, neither the WCB limit nor the flush watermark threshold represents the amount of data to be flushed in the variable-length data case. Therefore, the operation must track the amount of write to be flushed and make sure to initiate the flush operation after all portions are filled.

For tracking the total amount of writes before flush, the last entry to the WCB that has the highest address for the write portion must be captured. The last entry can be captured by examining whether the write portion has crossed the flush watermark threshold (write portion end>flush watermark threshold). If so, that last entry is selected as a flusher thread. The flusher thread then waits for all portions to be filled by checking whether the written offset counter has caught up to the end of the write portion (written offset=write portion end) and initiates the flush operation.

Procedural Overview

Figure 5:
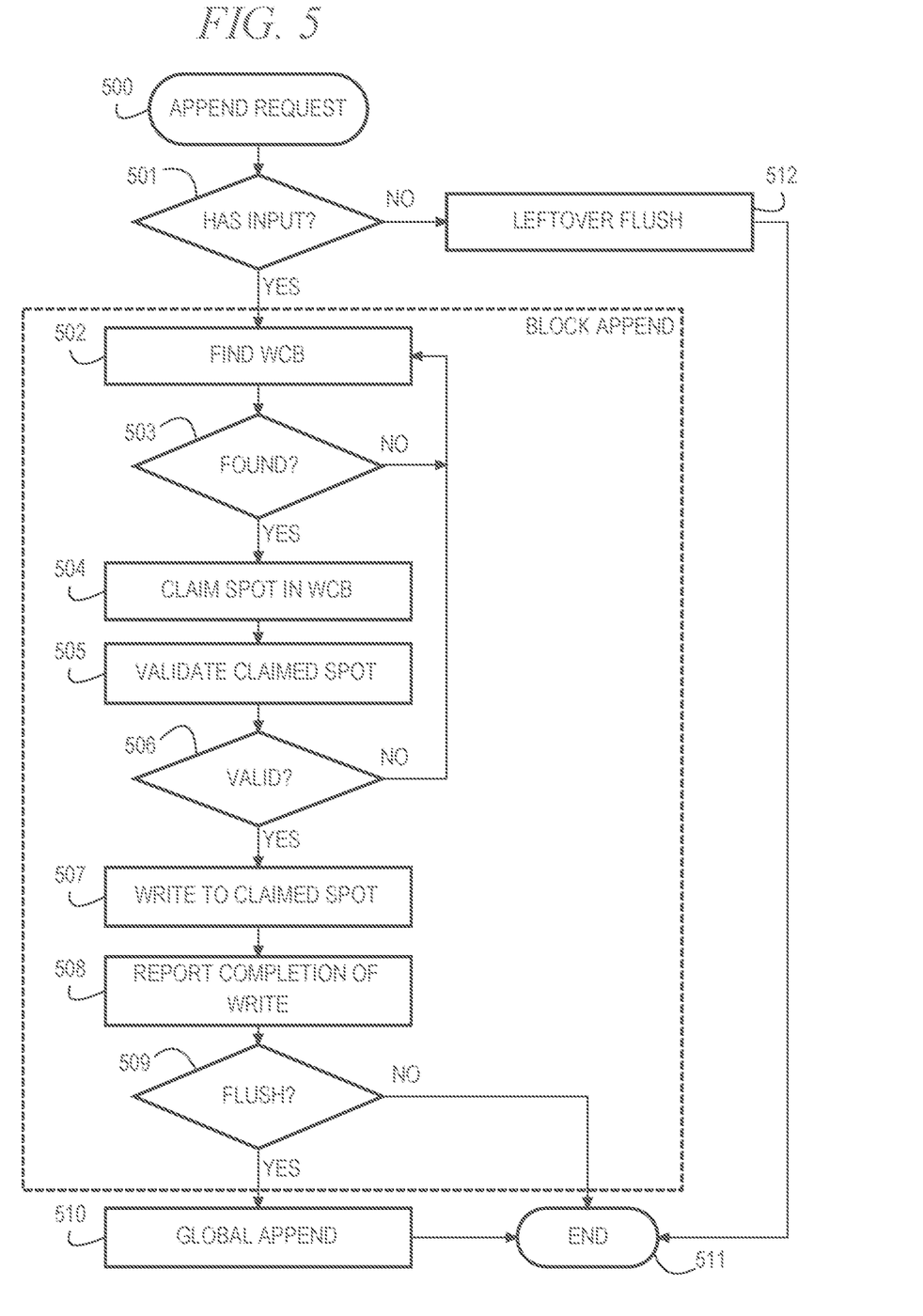
FIG. 5 is a flowchart illustrating an append operation in accordance with an illustrative embodiment.

FIG. 5 is a flowchart illustrating an append operation in accordance with an illustrative embodiment. Operation begins with an append request from a kernel running in a GPU (block 500). The append operation determines whether the kernel has input to process (block 501). If the kernel has input to process (block 501: YES), then a writer thread processing the input and attempting to write a result finds a WCB with available space to write a result (block 502). The writer thread then determines whether a WCB is found (block 503). If the writer thread does not find a WCB (block 503: NO), then operation returns to block 502 until the writer thread finds a WCB with sufficient available space.

If the writer thread finds a WCB (block 503: YES), then the writer thread claims a portion in the WCB (block 504). In one embodiment, the write portion start is set equal to atomicAdd (reserved offset counter, write size), and the atomicAdd returns the reserved offset counter value before the update. The write portion end is set equal to the write portion start plus the write size.

The writer thread then validates the claimed portion (block 505). In the fixed-size data case, the writer thread validates the claimed portion by determining whether the reserved offset counter value is less than the size of the WCB. In the variable-size data case, the writer thread validates the claimed portion by determining whether the write portion start is greater than or equal to the flush watermark threshold. The writer thread then determines whether the claimed portion is valid (block 506). If the claimed portion is not valid (block 506: NO), then operation returns to block 502 to find a WCB.

If the claimed portion is valid (block 506: YES), then the writer thread writes to the claimed portion (block 507) and reports completion of the write (block 508). The writer thread then determines whether a flush condition is met for the WCB (block 509). In the fixed-size data case, the flush condition is that the WCB has become full (written offset counter equals WCB size). In the variable-size data case, the flush condition is that the write portion end is greater than the flush watermark threshold. If the flush condition is met (block 509: YES), then the writer thread performs a global append operation (block 510), and operation ends (block 511). If the flush condition is not met (block 509: NO), then operation ends (block 511).

Returning to block 501, if the kernel does not have input to process (block 501: NO), then a master thread is elected for each thread block to perform a leftover flush operation (block 512). To perform the leftover flush, each master thread calculates the total size of all leftover results across WCBs in the shared memory of the thread block, increments the global offset counter atomically to claim a portion of global memory for the leftovers, and appends each WCB to the result buffer in global memory in parallel. Thereafter, operation ends (block 511).

Hardware Overview

According to one embodiment, the techniques described herein are implemented by one or more special-purpose computing devices. The special-purpose computing devices may be hard-wired to perform the techniques or may include digital electronic devices such as one or more application-specific integrated circuits (ASICs) or field programmable gate arrays (FPGAs) that are persistently programmed to perform the techniques or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
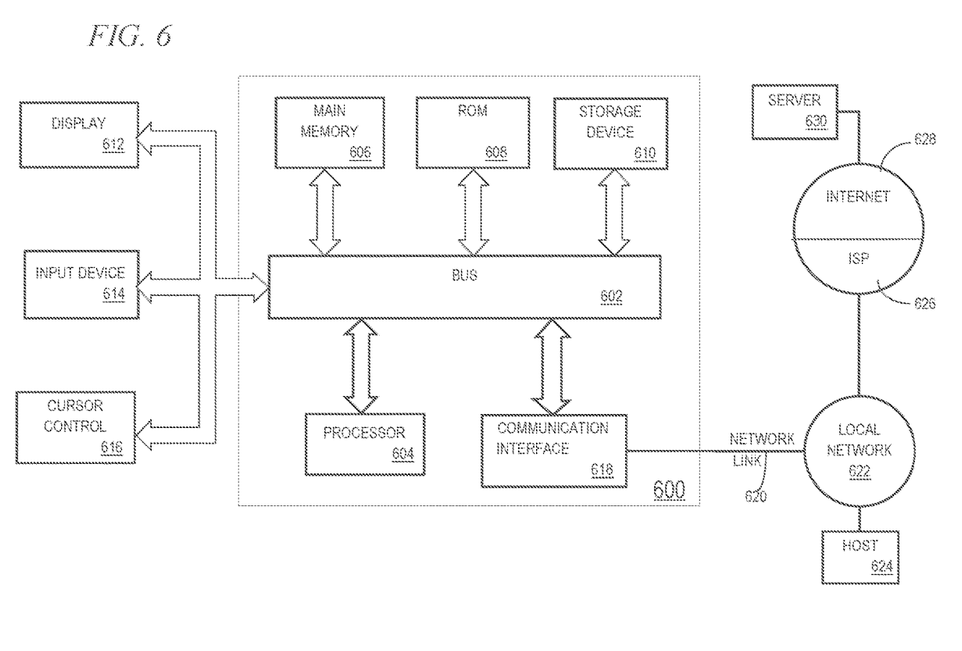
FIG. 6 is a block diagram that illustrates a computer system upon which an embodiment of the invention may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general-purpose microprocessor.

Computer system 600 also includes a main memory 606, such as a random-access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or solid-state drive is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 610. Volatile media includes dynamic memory, such as main memory 606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic, or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

What is claimed is:

1. A computer-implemented method comprising:
   executing an append operation using a plurality of threads on a plurality of streaming multiprocessors of a graphical processing unit, wherein:
      each streaming multiprocessor within the plurality of streaming multiprocessors has an associated shared memory;
      each shared memory is partitioned into a plurality of write combine buffers (WCBs);
      a global memory is accessible by the plurality of streaming multiprocessors;
      the append operation writes results into a result buffer in the global memory;
      executing the append operation comprises:
         claiming, by a given thread within the plurality of threads having a result to write, a portion of a selected WCB in shared memory;
         writing, by the given thread, the result to the portion of the selected WCB; and
         in response to a flush condition being met for the selected WCB, copying contents of the selected WCB to the result buffer in global memory.

2. The method of claim 1, wherein:
   each WCB has a reserved offset counter and a written offset counter;
   the reserved offset counter indicates space in the corresponding WCB that has been claimed by a thread;
   the written offset counter indicates an amount of data written to the corresponding WCB; and
   claiming the portion of the selected WCB comprises incrementing the reserved offset counter of the selected WCB atomically by a size of the result to be written.

3. The method of claim 2, wherein claiming the portion of the selected WCB further comprises validating the claimed portion of the selected WCB by determining whether the reserved offset counter for the selected WCB is in a valid range based on a size of the selected WCB.

4. The method of claim 2, wherein the selected WCB is selected based on determining that the selected WCB has space for writing the result based on the reserved offset counter.

5. The method of claim 1, wherein:
   each WCB has a written offset counter;
   the written offset counter indicates an amount of data written to the corresponding WCB; and
   executing the append operation comprises after writing the result to the portion of the selected WCB, incrementing the written offset counter of the selected WCB by a size of the result that was written.

6. The method of claim 5, wherein each WCB has a reserved offset counter, the method further comprising:
   after copying contents of the selected WCB to the result buffer in global memory, resetting the written offset counter and, after the written offset counter is reset to zero, resetting the reserved offset counter of the selected WCB to zero.

7. The method of claim 5, wherein the flush condition comprises the written offset counter of the selected WCB being greater than a flush watermark threshold.

8. The method of claim 1, wherein the flush condition comprises the selected WCB being full.

9. The method of claim 1, wherein:
the global memory has a global offset counter;
the global offset counter indicates an amount of data written to the global memory; and
executing the append operation further comprises incrementing the global offset counter atomically by a size of the selected WCB prior to copying the contents of the selected WCB to the result buffer.

10. The method of claim 9, further comprising:
responsive to the plurality of threads completing all writes of results:
identifying partially filled WCBs for which the flush condition is not met;
electing a master thread for a given streaming multiprocessor;
determining, by the master thread, a total size of partially filled WCBs in the shared memory of the given streaming multiprocessor;
incrementing, by the master thread, the global offset counter by the total size of the partially filled WCBs atomically; and
copying contents of the partially filled WCBs to the result buffer in parallel.

11. The method of claim 1, wherein the plurality of threads are divided into a plurality of thread blocks and each thread block executes on a corresponding streaming multiprocessor.

12. The method of claim 1, wherein the results being written by the append operation are hash probe results.

13. One or more non-transitory storage media storing instructions which, when executed by one or more computing devices, cause performance of a method comprising:
executing an append operation using a plurality of threads on a plurality of streaming multiprocessors of a graphical processing unit, wherein:
each streaming multiprocessor within the plurality of streamlining multiprocessors has an associated shared memory;
each shared memory is partitioned into a plurality of write combine buffers (WCBs);
a global memory is accessible by the plurality of streaming multiprocessors;
the append operation writes results into a result buffer in the global memory;
executing the append operation comprises:
claiming, by a given thread within the plurality of threads having a result to write, a portion of a selected WCB in shared memory;
writing, by the given thread, the result to the portion of the selected WCB; and
in response to a flush condition being met for the selected WCB, copying contents of the selected WCB to the result buffer in global memory.

14. The one or more non-transitory storage media of claim 13, wherein:
each WCB has a reserved offset counter and a written offset counter;
the reserved offset counter indicates space in the corresponding WCB that has been claimed by a thread;
the written offset counter indicates an amount of data written to the corresponding WCB; and
claiming the portion of the selected WCB comprises incrementing the reserved offset counter of the selected WCB atomically by a size of the result to be written.

15. The one or more non-transitory storage media of claim 14, the method further comprising validating the claimed portion of the selected WCB by determining whether the reserved offset counter for the selected WCB is in a valid range based on a size of the selected WCB.

16. The one or more non-transitory storage media of claim 13, wherein:
each WCB has a written offset counter;
the written offset counter indicates an amount of data written to the corresponding WCB; and
executing the append operation further comprises after writing the result to the portion of the selected WCB, incrementing the written offset counter of the selected WCB by a size of the result that was written.

17. The one or more non-transitory storage media of claim 16, wherein the flush condition comprises the written offset counter of the selected WCB being greater than a flush watermark threshold.

18. The one or more non-transitory storage media of claim 13, wherein:
the global memory has a global offset counter;
the global offset counter indicates an amount of data written to the global memory; and
the method further comprises incrementing the global offset counter atomically by a size of the selected WCB prior to copying the contents of the selected WCB to the result buffer.

19. The one or more non-transitory storage media of claim 18, the method further comprising:
responsive to the plurality of threads completing all writes of results:
identifying partially filled WCBs for which the flush condition is not met;
electing a master thread for a given streaming multiprocessor;
determining, by the master thread, a total size of partially filled WCBs in the shared memory of the given streaming multiprocessor;
incrementing, by the master thread, the global offset counter by the total size of the partially filled WCBs atomically; and
copying contents of the partially filled WCBs to the result buffer in parallel.

20. The one or more non-transitory storage media of claim 13, wherein the results being written by the append operation are hash probe results.

* * * * *

UNITED STATES PATENT AND TRADEMARK OFFICE
CERTIFICATE OF CORRECTION

| | | |
|---|---|---|
| PATENT NO. | : 12,153,539 B1 | Page 1 of 1 |
| APPLICATION NO. | : 18/201073 | |
| DATED | : November 26, 2024 | |
| INVENTOR(S) | : Kim et al. | |

It is certified that error appears in the above-identified patent and that said Letters Patent is hereby corrected as shown below:

In the Specification

In Column 6, Lines 36-37, delete "flush_watermark=WCB limit–$L$ max(the maximum possible size of a write)" and insert -- flush_watermark=WCB limit–$L$max(the maximum possible size of a write) --, therefor.

Signed and Sealed this
First Day of April, 2025

Coke Morgan Stewart
*Acting Director of the United States Patent and Trademark Office*